(12) United States Patent
Brandao et al.

(10) Patent No.: US 8,566,015 B2
(45) Date of Patent: Oct. 22, 2013

(54) METHODS AND SYSTEMS OF DETERMINING BEARING WHEN ADS-B DATA IS UNAVAILABLE

(75) Inventors: Ruy L. Brandao, Ft. Lauderdale, FL (US); Ruy C. Brandao, Sr., Redmond, WA (US); Christine M. Haissig, Chanhassen, MN (US); John Weed, Mill Creek, WA (US); Eric A. Euteneuer, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 807 days.

(21) Appl. No.: 12/795,511

(22) Filed: Jun. 7, 2010

(65) Prior Publication Data

US 2010/0250138 A1    Sep. 30, 2010

Related U.S. Application Data

(62) Division of application No. 11/161,873, filed on Aug. 19, 2005, now Pat. No. 7,761,196.

(60) Provisional application No. 60/615,177, filed on Oct. 1, 2004.

(51) Int. Cl.
*G06F 17/00* (2006.01)
*G06G 7/78* (2006.01)
*G08G 1/16* (2006.01)

(52) U.S. Cl.
USPC ............... 701/301; 701/302; 701/1; 701/3

(58) Field of Classification Search
USPC ................... 701/301, 302, 1, 3–18
See application file for complete search history.

(56) References Cited

U.S. PATENT DOCUMENTS

| 5,077,673 A | 12/1991 | Brodegard et al. |
| 5,153,836 A | 10/1992 | Fraughton et al. |

OTHER PUBLICATIONS

Bernays, D.J., Drumm, et al; Validation Techniques for ADS-B Surveillance Data; MIT Lincoln Laboratory, Lexington, MA. 2002 IEEE.

*Primary Examiner* — Bhavesh V Amin
(74) *Attorney, Agent, or Firm* — Shumaker & Sieffert, P.A.

(57) ABSTRACT

System, method and computer program product for determining bearing using ADS-B and TCAS standard reply bearing estimates are disclosed. In one embodiment, a method for determining bearing based upon ADS-B signals includes receiving ADS-B signals and standard transponder reply signals. A first bearing estimate is based on the ADS-B signal. A second bearing estimate is based on the standard transponder reply signals. A database is developed according to the first and second bearing estimates via the ADS-B and standard transponder reply signals. In one embodiment, where ADS-B signals are unavailable, associated ADS-B signals associated with the standard transponder reply previously stored in the database are used to determine bearing.

5 Claims, 4 Drawing Sheets

| STANDARD TRANSPONDER REPLY | ADS-B SIGNAL |
|---|---|
| 10 | 5 |
| 15 | 20 |
| 20 | 25 |
| . | . |
| . | . |
| . | . |

*FIG. 4*

| STANDARD TRANSPONDER REPLY | ADS-B | $\bar{x}$ |
|---|---|---|
| 10 | 5 | 7.5 |
| 15 | 20 | 17.5 |
| 20 | 25 | 22.5 |
| . | . | . |
| . | . | . |
| . | . | . |

*FIG. 5*

METHODS AND SYSTEMS OF DETERMINING BEARING WHEN ADS-B DATA IS UNAVAILABLE

PRIORITY CLAIM

This application is a Divisional Application of U.S. patent application Ser. No. 11/161,873, filed on Aug. 19, 2005, which claims priority to U.S. Patent Application Ser. No. 60/615,177, filed on Oct. 1, 2004, and are hereby incorporated by reference.

BACKGROUND OF THE INVENTION

A Traffic Collision Avoidance System (TCAS) is an electronic system installed in aircraft that searches for and alerts pilots as to the presence of other aircrafts, including generation of actions to avoid approaching aircraft. TCAS operates independently of ground based equipment to give audible and visual warnings when there is a threat of collision with another aircraft. In conjunction with TCAS systems, transponders respond to interrogation with a special code that specifically identifies the aircraft on which it is located. Certain transponders have the ability to automatically transmit the altitude of the aircraft in addition to the special code. Hereinafter TCAS/Transponder based active surveillance systems are referred to as Traffic Surveillance Units—TCUs.

TCU-based active surveillance relative bearing estimates are accurate if the transponder is sending automatic dependent surveillance broadcast (ADS-B) data, measuring latitude and longitude. When ADS-B data is unavailable, TCU-based surveillance bearing estimates are limited in determining the bearing accurately due to many causes, both internal and external to the system. Accurate bearing measurements are important for navigational purposes. For example, bearing is required for autopilot station keeping, display, and taxing.

Therefore, there is a need to accurately measure bearing when ADS-B data is unavailable.

BRIEF SUMMARY OF THE INVENTION

The present invention provides methods and systems for determining bearing in a surveillance system when ADS-B data is unavailable. In one embodiment, the method involves determining bearing according to ADS-B signals and standard transponder reply signals. A first bearing estimate is based on the ADS-B signal. A second bearing estimate is based on the standard transponder reply signal. A database is developed according to the first and second bearing estimates using the ADS-B and standard transponder reply signals. In another embodiment, where ADS-B signals are not available, ADS-B signals associated with the standard transponder reply previously stored in the database are used to determine bearing.

Further, the present invention provides methods and systems that enable standard interrogation/reply TCAS surveillance to achieve traffic bearing accuracy. In one embodiment, the surveillance system determines the arrival angle of the signal based on the position report contained within the ADS-B signals and its own position corrected for time. The surveillance system stores information in a multi-dimensional table, a relational database or any other method that easily relates the following information for convenient processing, including measured azimuth angle of the signal, elevation angle, amplitude of the signal, estimated frequency of the signal, and computed azimuth angle of reporting aircraft.

BRIEF DESCRIPTION OF THE DRAWINGS

FIG. 4 is a multi-dimensional table in accordance with still another embodiment of the present invention; and FIG. 5 is a multi-dimensional table in accordance with yet another embodiment of the present invention.

DETAILED DESCRIPTION OF THE PREFERRED EMBODIMENT

Figure 1:
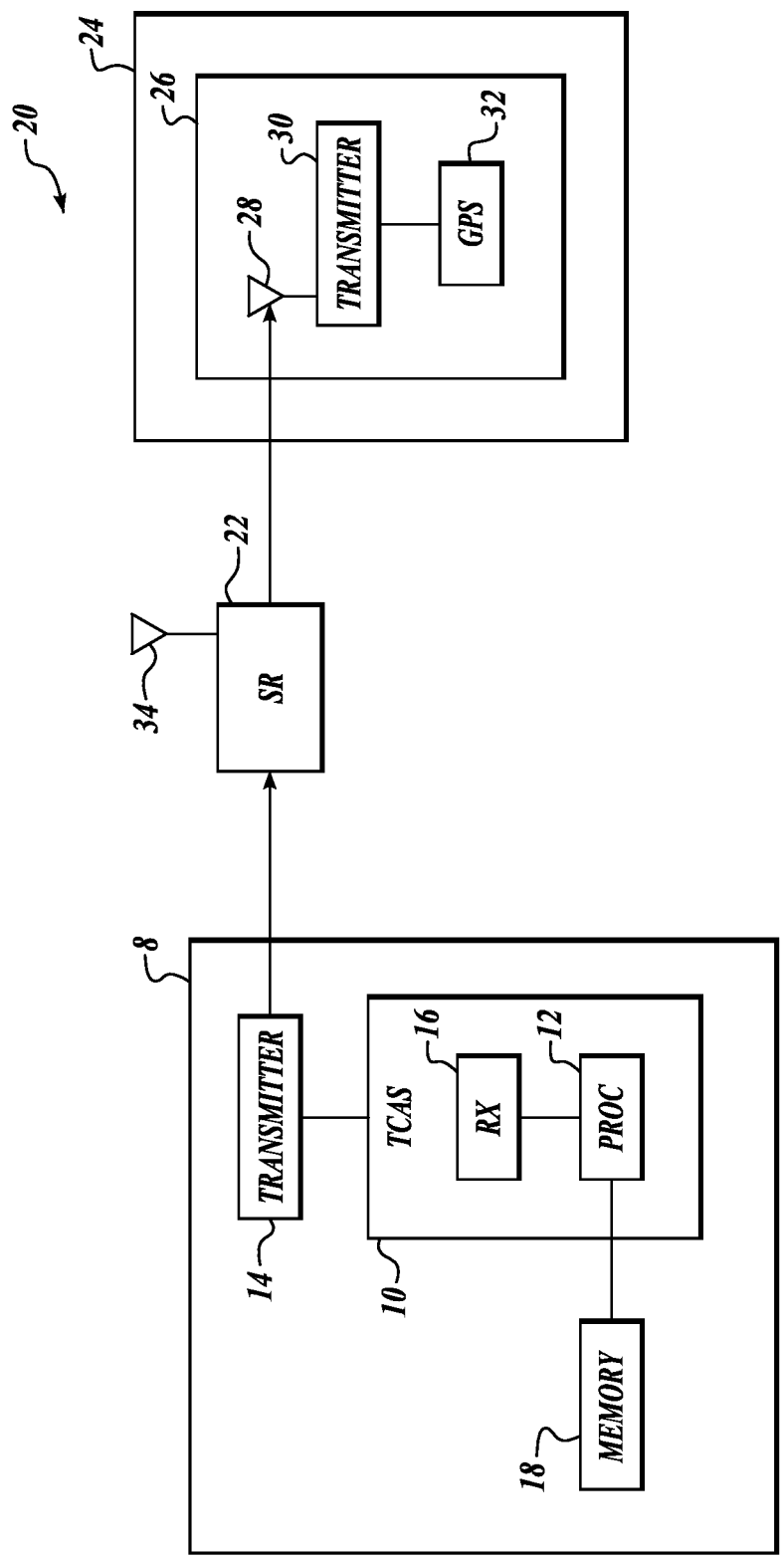
FIG. 1 illustrates a schematic view of the system in accordance with an embodiment of the present invention.

FIG. 1 illustrates a schematic view of an example system 20. In one embodiment, the system 20 includes a TCAS system 10 aboard a host aircraft 8 that includes a processor 12, a transmitter 14, and a receiver 16. The transmitter 14 generates an interrogation signal based upon surveillance alerts, such as approaching aircraft and threat potentials, produced by a surveillance radar 22. The surveillance radar 22 transmits TCAS transmitter 14 interrogation signals and receives replies at a receiving device 34. A target aircraft 24 includes a surveillance system 26 that receives the interrogation signal at a transmitter receiving device 28 and when interrogated generates a standard transponder reply signal via a transmitter 30. The target aircraft 24 surveillance system 26 may also send an ADS-B reply signal via a navigational component such as a Global Positioning System (GPS) 32, whenever ADS-B data is available.

ADS-B data provides automatic or autopilot capabilities (i.e. it is always on and requires no operator intervention) and uses accurate position and velocity data from aircraft navigation systems, including latitude and longitude measurements. ADS-B broadcasts aircraft position, altitude, velocity and other data that can be used by air traffic control and other aircraft to share the aircraft's position and altitude without the need for radar.

Whenever the system 20 is not broadcasting, it is listening for Mode-S squitters and reply transmissions at the same frequency used by Mode-S transponders to reply to interrogation signals. Mode-S is a combined secondary surveillance radar and a ground-air-ground data link system which provides aircraft surveillance and communication necessary to support automated air traffic control in dense air traffic environments. Once per second, the Mode-S transponder spontaneously and pseudo-randomly transmits (squits) an unsolicited broadcast. Whenever the Mode-S is not broadcasting, it is monitoring or listening for transmissions. Thus, a TCAS equipped aircraft can see other aircraft carrying a transponder. Once a transponder equipped target has been seen, the target is tracked and a threat potential is determined. Altitude information is essential in determining a target's threat potential. Comparison between the altitude information encoded in the reply transmission from the target aircraft 24 and the host aircraft 8 is made in the processor 12 and the pilot is directed to obtain a safe altitude separation by descending, ascending or maintaining current altitude.

Knowledge of the direction, or bearing, of the target aircraft 24 relative to the host aircraft 8 greatly enhances the pilot's ability to visually acquire the threat aircraft and provides a better spatial perspective of the threat aircraft relative to the host aircraft. The processor 12 can display bearing information if it is available. Bearing information is also used by the processor 12 to determine threat potential presented by an intruder aircraft.

The system 20 determines relative bearing by sending the interrogation signal to the target aircraft 24 and listening for replies that return from the target aircraft 24. The reply from the target aircraft 24 may include a standard transponder reply and an ADS-B reply signal. The standard transponder reply gives an estimated bearing by measuring the multi-path interference from the target aircraft 24, including phase and amplitude measurements, speed direction, and altitude. The ADS-B reply signal includes the more accurate bearing measurements of latitude and longitude. When the target aircraft 24 has generated replies to the TCAS 10 interrogation signal, the standard transponder reply and/or the ADS-B reply signal is received by the TCAS receiver 16 and stored in a memory device 18 coupled to the processor 12. The memory device 18 collects varying signals and stores them in an internal database for later use by the processor 12 in determining bearing when ADS-B data is unavailable.

Algorithms within the processor 12 use the relationships between estimated bearing based on standard transponder replies versus bearing computed from ADS-B signals to generate a table or other multi-dimensional expression of the database of information stored in the memory 18. Further, the processor 12 corrects values between the standard transponder reply and ADS-B reply signals to more accurately determine bearing, including averaging the standard transponder reply values and ADS-B values and associating the ADS-B values to previously stored standard transponder reply values (see FIGS. 4 and 5).

Figure 2:
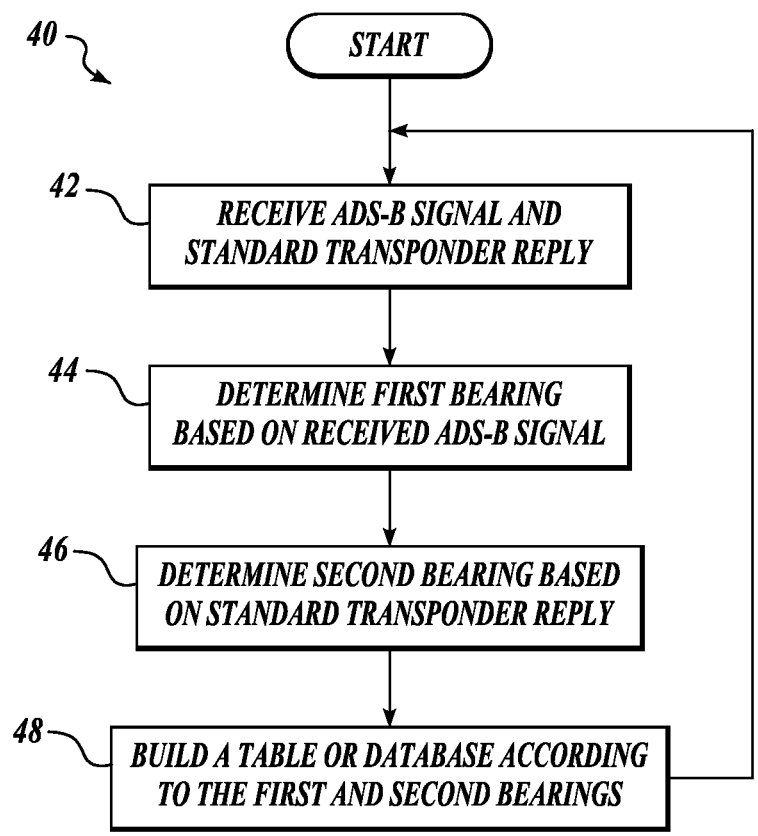
FIG. 2 is a flowchart of a method of building a database using ADS-B data in accordance with an alternate embodiment of the present invention.

FIG. 2 is a flowchart of an example method 40 of building a table in accordance with an embodiment of the invention. At a block 42, the TCAS receiver 16 receives ADS-B signals and standard transponder reply signals from a target aircraft 24. The processor 12 determines a first bearing based on the ADS-B reply signal at a block 44. It will be appreciated, however, that the processor 12 may determine a first bearing based on the standard reply and a second bearing based on the ADS-B reply signal. In one embodiment, at a block 46, the processor 12 determines a second bearing based on the standard transponder reply. At a block 48, a table or database is built according to ADS-B signals and the standard transponder reply data. The table or multidimensional database may include a comparison between standard transponder reply data versus ADS-B data and correction factors.

Figure 3:
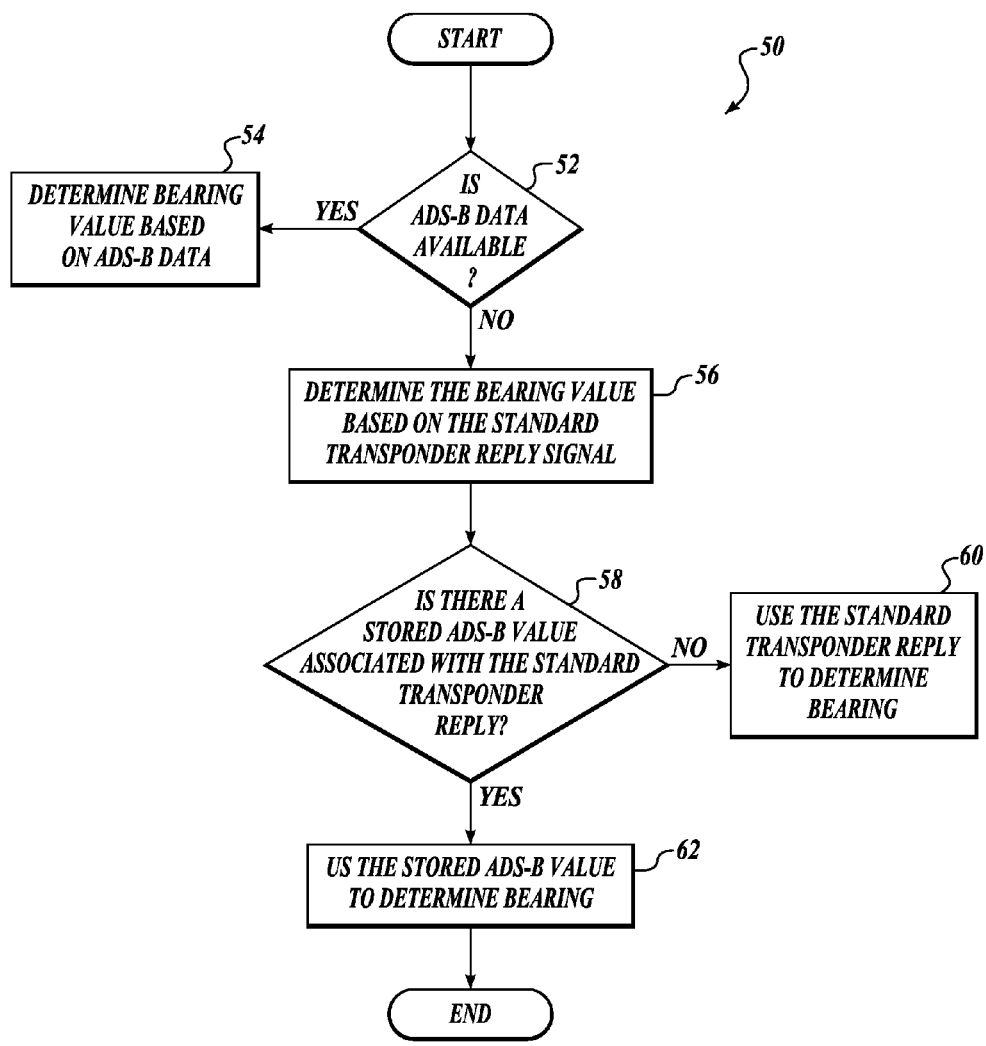
FIG. 3 is a flowchart of a method of determining bearing using the database developed with FIG. 2 in accordance with another embodiment of the present invention.

FIG. 3 is a flowchart of a method of determining bearing using the database developed with reference to FIG. 2. At a determination block 52, a determination is made as to whether ADS-B data is available. This determination is usually performed once during the process. If ADS-B data is available, bearing is determined using the ADS-B data, at a block 54. If ADS-B data is not available, bearing is determined by using the standard transponder reply signals, at a block 56.

At a block 58, a determination is made as to whether there is an ADS-B value associated with the standard transponder reply as previously stored in the database. If no associated ADS-B value is stored in the database, the standard transponder reply is used to determine relative bearing at a block 60. If associated ADS-B values are available, the associated ADS-B values previously stored in the database are used to determine bearing at a block 62.

FIG. 4 is a multi-dimensional table developed in accordance with an embodiment of the present invention. In one embodiment, the table includes a look-up table. One will appreciate, however, that any table or graphical representation of the data is applicable and may be suitably employed. For example, alternate embodiments include any multi-dimensional table or relational database. Referring still to FIG. 4, the table includes at least two measurements of data—standard transponder reply data and ADS-B data. As shown in FIG. 5, an alternate embodiment of the table includes a correction factor, or average $\bar{x}$, between the two measurements. In other embodiments, the table includes other look-up parameters. For example, the TCAS may receive an ADS-B signal via a DF-17 where the processor 12 computes parameters based on the ADS-B signal, including, received azimuth or bearing of the ADS-B signal and other characteristics of the received signal which help characterize the received signal, i.e. estimation of signal frequency and amplitude of received signal and time of arrival. In one embodiment, the TCAS 10 extracts the following information from data encoded in the ADS-B signal latitude, longitude, and relative altitude.

Further, the table is processed by the processor 12 so that entries for the same bearing, elevation angle, etc. will be averaged or filtered with data already in the table to improve and smooth data already in the table. In one embodiment, the table or data is stored in some kind of non-volatile memory (NVM) so that it can be used at a later time—even after the TCAS 10 has been powered off. In another embodiment, data is continuously improved and updated. In an alternate embodiment, the data is stored so that it can be available when ADS-B signals or latitudes, longitude data is not available in a standard interrogation/reply TCAS surveillance, especially when GPS data is not available either from a particular aircraft or generally not available to any particular area. In this particular embodiment, where ADS-B values are not available, associated standard values with reference to previously stored ADS-B values may be employed to determine bearing.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A non-transitory computer program product residing on a computer readable medium, and the medium being used by a processor to execute the program product the product comprising:
 a memory for storing associated bearing values;
  a software for generating a traffic collision and avoidance system (TCAS) interrogation signals;
  a software for receiving a reply to the interrogation signal; and
  a software for determining bearing based upon the stored associated bearing values.

2. The product of claim 1, further comprising a bearing database software comprising:
 a first bearing based on an ADS-B signal;
 a second bearing based on standard transponder reply signal; and
 a software for building a database.

3. The product of claim 2, wherein the ADS-B signal includes at least one of latitude and longitude measurements, further including at least one of azimuth, estimation of signal frequency, amplitude of received signal and time of arrival.

4. The product of claim 2, wherein the standard transponder reply signals includes at least one of phase, amplitude, speed, direction, and altitude.

5. The product of claim 2, wherein the software for storing includes a look-up comparison table for comparing the ADS-B signals to the standard transponder reply signals.

* * * * *